(12) United States Patent
Chen

(10) Patent No.: US 8,300,537 B2
(45) Date of Patent: *Oct. 30, 2012

(54) METHOD AND APPARATUS FOR DIAGNOSING FAULTS IN A HYBRID INTERNET PROTOCOL NETWORK

(75) Inventor: Weijing Chen, Leander, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/701,020

(22) Filed: Feb. 5, 2010

(65) Prior Publication Data

US 2010/0135163 A1    Jun. 3, 2010

Related U.S. Application Data

(63) Continuation of application No. 11/191,758, filed on Jul. 28, 2005, now Pat. No. 7,684,335.

(51) Int. Cl.
*H04J 1/16* (2006.01)
(52) U.S. Cl. .................. 370/236.1; 370/236.2
(58) Field of Classification Search .......... 370/236, 370/255, 236.2, 389, 248, 236.1, 312, 400–402, 370/241.1, 242
See application file for complete search history.

(56) References Cited

U.S. PATENT DOCUMENTS

| 5,519,704 | A | 5/1996 | Farinacci et al. |
| 5,818,838 | A | 10/1998 | Backes et al. |
| 6,480,508 | B1 | 11/2002 | Mwikalo et al. |
| 6,693,909 | B1 | 2/2004 | Mo et al. |
| 6,785,274 | B2 | 8/2004 | Mahajan et al. |
| 6,795,858 | B1 | 9/2004 | Jain et al. |
| 7,684,335 | B2 * | 3/2010 | Chen ................ 370/236 |
| 2002/0170004 | A1 | 11/2002 | Parrett et al. |
| 2003/0182269 | A1 | 9/2003 | Cheshire |
| 2003/0200335 | A1 | 10/2003 | Choi et al. |

FOREIGN PATENT DOCUMENTS

JP    2004364065    12/2004

* cited by examiner

*Primary Examiner* — Brenda H Pham
(74) *Attorney, Agent, or Firm* — Guntin Meles & Gust, PLC; Pablo Meles

(57) ABSTRACT

An Ethernet switch (112) has a communications interface (122), and a controller (124). The controller is programmed to receive (202) an IP query packet generated by a receiver for collecting telemetry data between a source and the receiver in a multicast network, translate (206) the IP query packet to an Ethernet query packet, collect (208) in the Ethernet query packet telemetry data from the Ethernet switch, and submit (218) the Ethernet query packet to the next network element of the multicast network. Additional embodiment are disclosed.

20 Claims, 4 Drawing Sheets

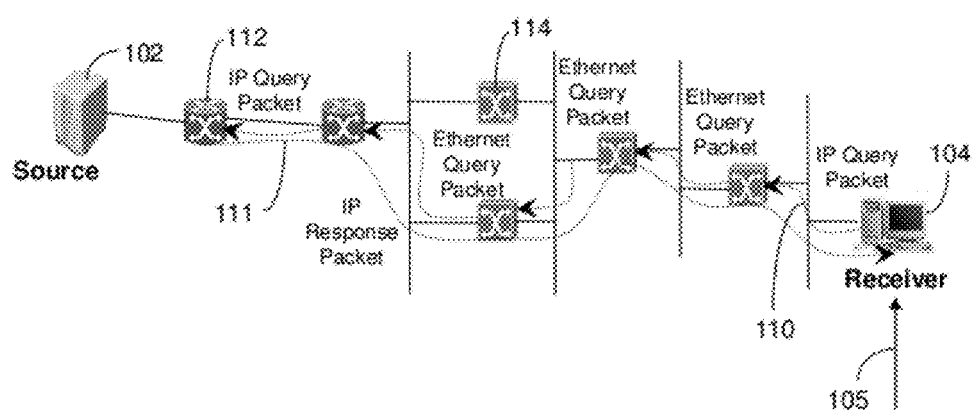
FIG. 1  100
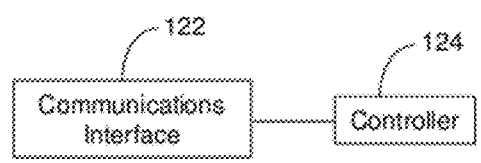
FIG. 2  112, 114

METHOD AND APPARATUS FOR DIAGNOSING FAULTS IN A HYBRID INTERNET PROTOCOL NETWORK

CROSS REFERENCE TO RELATED APPLICATIONS

This application is a continuation of U.S. patent application Ser. No. 11/191,758, filed Jul. 28, 2005, the disclosure of which is hereby incorporated by reference.

FIELD OF THE INVENTION

This invention relates generally to IP (Internet Protocol) diagnostic systems, and more particularly to a method and apparatus for diagnosing faults in a hybrid IP network.

BACKGROUND OF THE INVENTION

As hybrid packet networks continue to evolve, the need for diagnosing troubled connections becomes increasingly important to the service provider of such networks. Hybrid IP (Internet Protocol) networks can include, for example, conventional IP routers and Ethernet switches for interconnecting parties. It is very common for these networks to support multicast communications (e.g., streaming video) between a source and many receivers such as computer terminals. When a user of a receiver experiences a communication interruption, it is common practice for the user to call the service provider and seek technical assistance.

Typically, service providers employ conventional diagnostic tools operating at the receiver of the end user to diagnose faults in the multicast connection. Tools such as "Mtrace" can be used to trace the multicast route from the receiver to the source. Consequently, the service provider can quickly diagnose, for example, a faulty router or links and thereby take evasive action to restore service to the end user. In hybrid networks, however, Ethernet switches serve as a pass-through devices in which IP mtrace packets are relayed between switches without inclusion of telemetry data from the switches. Consequently, if the communication issue arises from a fault at an Ethernet switch or sequence of switches, the service provider has no means of detecting the fault with a conventional Mtrace diagnostic test.

A need therefore arises for a method and apparatus for diagnosing faults in a hybrid IP network.

SUMMARY OF THE INVENTION

Embodiments in accordance with the invention provide a method and apparatus for diagnosing faults in a hybrid IP network.

In a first embodiment of the present invention, an IP router and an Ethernet switch, respectively, has a computer-readable storage medium for conducting diagnostics in a multicast network having network elements comprising one or more IP (Internet Protocol) routers and Ethernet switches. The storage medium of an Ethernet switch has computer instructions for receiving an IP query packet generated by a receiver for collecting telemetry data between a source and the receiver, translating an IP query packet to an Ethernet query packet, collecting in the Ethernet query packet telemetry data from the Ethernet switch, and submitting the Ethernet query packet to the next network element of the multicast network. The storage medium of an IP router has computer instructions for receiving the Ethernet query packet, translating the Ethernet query packet to an IP query packet, collecting in the IP query packet telemetry data from the IP router, and submitting the IP query packet to the next network element of the multicast network.

In a second embodiment of the present invention, an IP router and an Ethernet switch, respectively, operate according to a method for conducting diagnostics in a multicast network having network elements comprising one or more IP (Internet Protocol) routers and Ethernet switches. At an Ethernet switch, the method comprises the steps of receiving an IP query packet generated by a receiver for collecting telemetry data between a source and the receiver, translating an IP query packet to an Ethernet query packet, collecting in the Ethernet query packet telemetry data from the Ethernet switch, and submitting the Ethernet query packet to the next network element of the multicast network. At an IP router, the method comprises the steps of receiving the Ethernet query packet, translating the Ethernet query packet to an IP query packet, collecting in the IP query packet telemetry data from the IP router, and submitting the IP query packet to the next network element of the multicast network.

In a third embodiment of the present invention, an Ethernet switch has a communications interface, and a controller. The controller is programmed to receive an IP query packet generated by a receiver for collecting telemetry data between a source and the receiver in a multicast network, translate the IP query packet to an Ethernet query packet, collect in the Ethernet query packet telemetry data from the Ethernet switch, and submit the Ethernet query packet to the next network element of the multicast network.

In a fourth embodiment of the present invention, an IP router has a communications interface, and a controller. The controller is programmed to receive an Ethernet query packet generated by an Ethernet switch for collecting telemetry data between a source and a receiver in a multicast network, translate the Ethernet query packet to an IP query packet, collect in the IP query packet telemetry data from the IP router, and submit the IP query packet to the next network element of the multicast network.

BRIEF DESCRIPTION OF THE DRAWINGS

FIG. 1 is block diagram of a hybrid network of Ethernet switches and IP routers according to an embodiment of the present invention;

FIG. 2 is block diagram of the IP router and the Ethernet switch, respectively, according to an embodiment of the present invention;

DETAILED DESCRIPTION OF THE DRAWINGS

Figure 3:
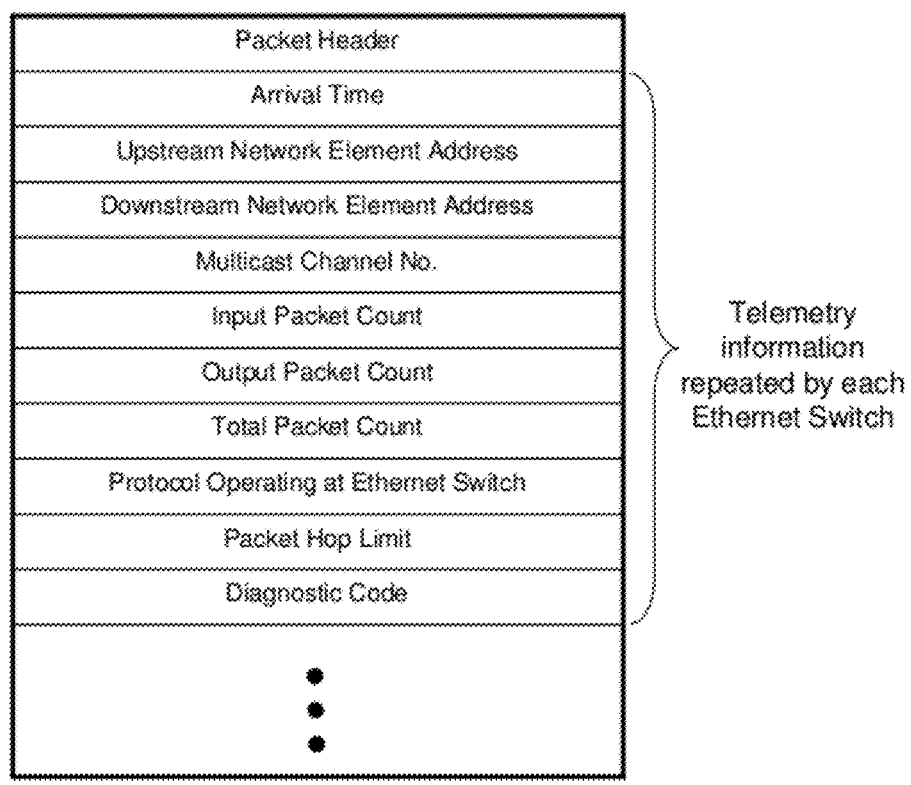
FIG. 3 is block diagram depicting a format of an Ethernet query packet according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram of a hybrid network 100 of Ethernet switches 114 and IP routers 112 according to an embodiment of the present invention. The present illustration represents a multicast network created between a source 102 (e.g., a server supplying streaming video) and a receiver 104 (e.g., a computer terminal of an end user). A multicast network in the present context extends the broadcast concept of one to many by allowing the sending of one transmission to many users in a defined group, but not necessarily to all users in that group.

Large service providers typically encounter a mix of network elements such as shown in FIG. 1. The Ethernet switches 114 can, for example, represent IGMP (Internet Group Management Protocol) snooping Ethernet switches. These switches can reside in a customers network, or can be supplied by the service provider. The IP routers 112 are conventional Internet Protocol routers available from many vendors such as, for example, Cisco™ Corporation.

FIG. 2 is basic block diagram of an IP router 112 and Ethernet switch 114, respectively, according to an embodiment of the present invention. Each device includes a communications interface 122 and a controller 124. In the case of an IP router 112, the communications interface 122 includes conventional technology that serves to interconnect the IP router 112 with other IP network elements of the hybrid network shown in FIG. 1. The interface 122 is bidirectional in that IP packets can either be generated or received at the interface and redirect to other network elements according to the routing tables established at the IP router 112. The controller 124 utilizes conventional computing technology such as one or more microprocessors, DSPs (Digital Signal Processors) and associated media storage (e.g., RAM, SRAM, DRAM, Flash, or disk media) for controlling operations of the IP router 112 in accordance with the present invention.

Like the IP router 112, the Ethernet switch 114 can include a communications interface 122 and a controller 124. These components, however, are tailored for Ethernet traffic as defined by such standards as IEEE 802.3. The communications interface 122 in this instance supports CSMA/CD (Carrier Sense Multiple Access Collision Detection) access method to handle simultaneous demands. This interface is one of the most widely implemented LAN standards. A newer version of Ethernet, called 100 Base-T (or Fast Ethernet) supports data transfer rates of 100 Mbps. The present invention, however, can be applied to any Ethernet switch 114 technology including 1G and 10G. The controller 124 in this embodiment can utilize conventional processing technology similar to what was described for the IP router 112 to support the functions of the Ethernet switch 114 in accordance with the present invention.

It should be noted that the communications interface 122 of the IP routers 112 and Ethernet switches 114, respectively, also utilize conventional technology for hybrid interconnects between said systems thereby allowing the formation of the hybrid network shown in FIG. 1.

Figure 4:
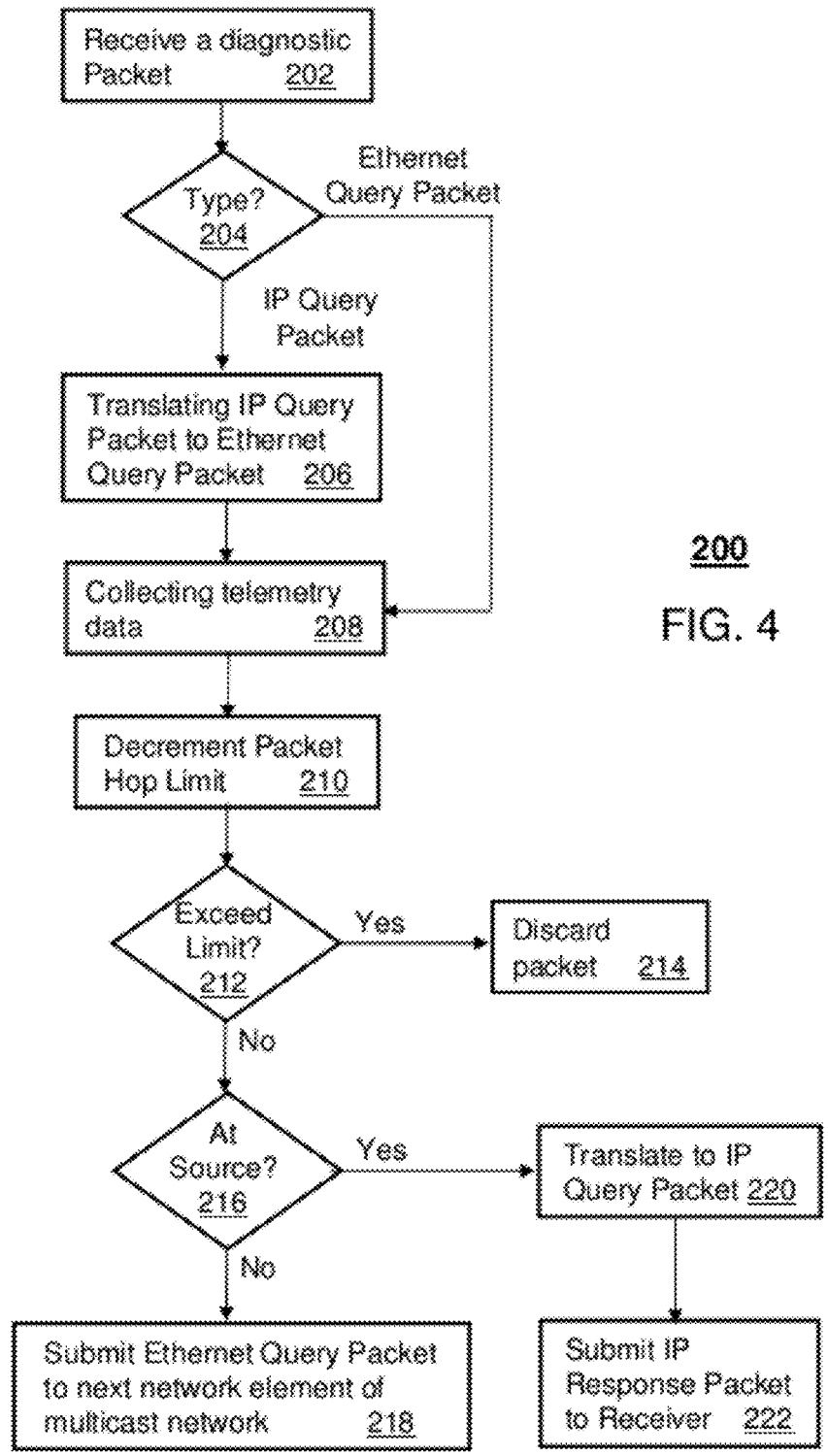
FIGS. 4-5 depict flowcharts of methods operating in the Ethernet switches and IP routers, respectively, according to an embodiment of the present invention.
Figure 5:
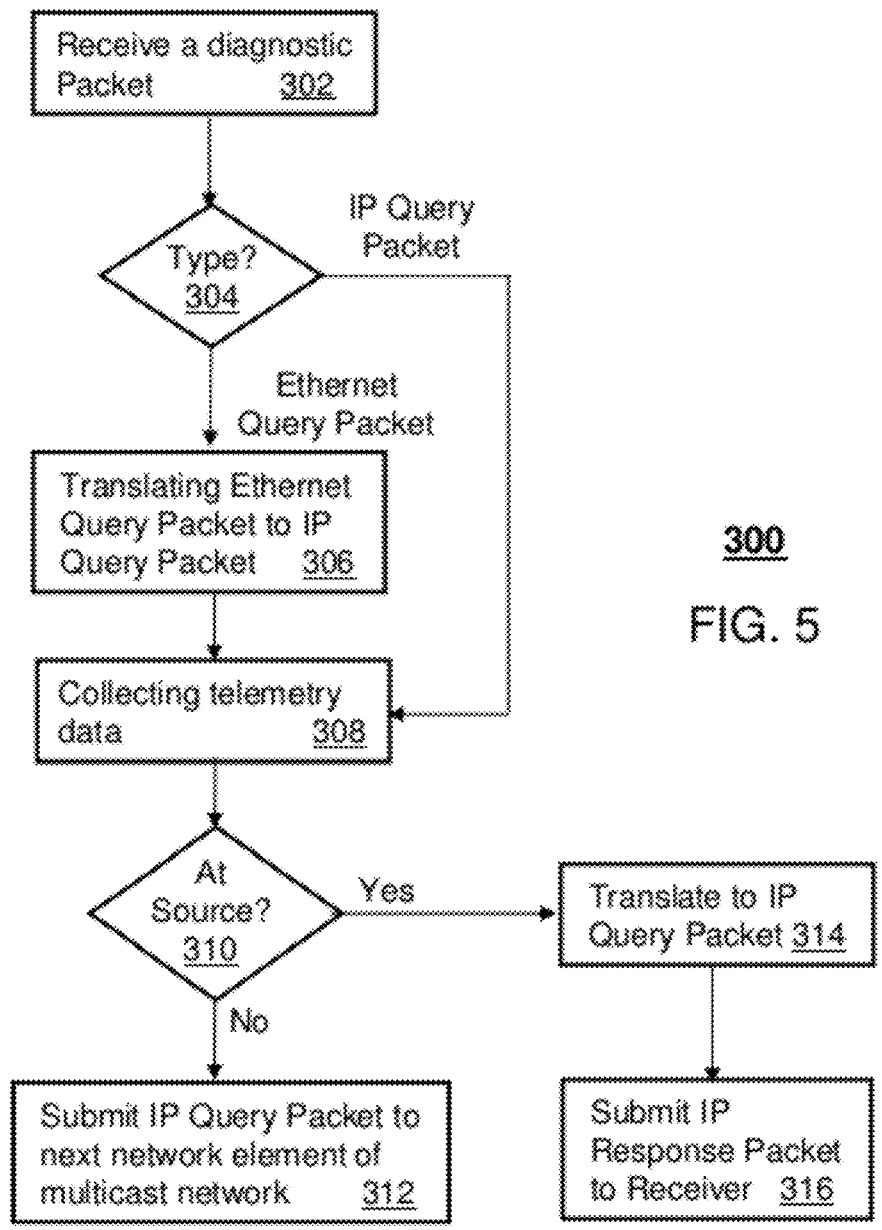

FIGS. 4-5 depict flowcharts of methods 200 and 300 operating in the Ethernet switches and IP routers, respectively, according to an embodiment of the present invention. Method 200 represents the flow of a diagnostic packet in a trace route 110 initiated by the receiver 104 of FIG. 1 under the control of, for example, a management system (not shown) of the service provider of the hybrid network connected to the receiver 104 by way of another communication link 105 of the service provider's network.

The trace route 110 traces each network element connecting the receiver 104 and the source 102 in a multicast network. Once the trace packet reaches the source 102, a unicast IP response packet returns back on a response route 111. The response route 111 can travel on the same network elements as did the trace route 110 or in a unicast path different from these elements. In either case, the IP response packet travels in the reverse direction towards the receiver 104. The IP response packet includes telemetry information collected from each network element connecting the source 102 and receiver 104. The receiver 104 can process or relay this telemetry information to the service provider who in turn determines where and why a communication interruption may have occurred.

Referring back to FIG. 4, method 200 begins with step 202 where the Ethernet switch 114 receives a diagnostic packet. The diagnostic packet can be an IP query packet (such as an mtrace packet) or an Ethernet query packet. In the illustration of FIG. 1, the first network element coupled to the receiver 104 is an Ethernet switch 114. In this illustration the Ethernet switch 114 receives an IP query packet from the receiver 104. It will be appreciated that the multicast network of FIG. 1 configuration is simply illustrative. That is, the receiver 104 could have in the alternative been coupled to an IP router 112, and the Ethernet switches 114 could have been located upstream in the multicast network. Thus, whether an IP query packet comes directly from the receiver 104 or and IP router 112, the Ethernet switch 114 is programmed to process either format.

In the present instance, however, it is assumed that the packet received and detected in steps 202 and 204 is an IP query packet, in which case the Ethernet switch 114 proceeds to step 206 where it translates the IP query packet to an Ethernet query packet. FIG. 3 is block diagram depicting a format of an Ethernet query packet according to an embodiment of the present invention. In this embodiment, the Ethernet query packet can include one or more of the following telemetry fields:

An arrival time of the Ethernet query packet at the switch 114;

An upstream network element address, which identifies the next network element (i.e., an IP router 112 or Ethernet switch 114) located adjacent to the switch in question, and upstream towards the source 102 of the multicast data;

A downstream network element address, which identifies the previous network element (i.e., an IP router 112 or Ethernet switch 114) located adjacent to the switch in question, and downstream towards the receiver 104;

A multicast channel number (or group number), which identifies the channel used between the source 102 and receiver 104 in the multicast network;

An input packet count at the arrival time, which identifies the number of packets received by the switch at the time the query packet arrives;

An output packet count at the arrival time, which identifies the number of packets transmitted by the switch at the time the query packet arrives;

A total packet count at the arrival time, which identifies the total number of packets processed by the switch at the time the query packet arrives;

A protocol operating at the receiving Ethernet switch (e.g., IGMP);

A packet hop limit, which sets a limit on how many network elements can be traversed by the query packet; and A diagnostic code, which provides a state of operation of the Ethernet switch 114.

The diagnostic code can in turn can include:

A no error code corresponding to a no-fault state in the receiving Ethernet switch 114;

A wrong interface code corresponding to an IP or Ethernet query packet received by the Ethernet switch from a network element not belonging to the multicast network;

A channel route error code corresponding to an IP or Ethernet query packet received from a network element on a multicast network channel different from that used by the receiver; and A router error code corresponding to receiving an IP query packet from an unexpected IP router.

The foregoing fields are illustrative of the telemetry fields and diagnostic codes that can be used in an Ethernet query packet for isolating and diagnosing faults in a hybrid network of IP routers 112 and Ethernet switches 114. It would be obvious to an artisan with skill in the art that other telemetry data not mentioned above that can prove useful for isolating faults in a hybrid network such as shown in FIG. 1 is within the scope and spirit of the claimed invention.

Referring back to FIG. 4, the Ethernet switch 114 populates the aforementioned telemetry fields in step 208. In step 210, the switch 114 decrements the packet hop limit This field is initially established by the receiver 104 with a number that represents the number of allowable network element hops. This field can prove useful in limiting the number of hops a query packet undertakes in a multicast network. It is especially important in that it can be used to destroy query packets that get lost in the network for any apparent reason. As each Ethernet switch 114 receives an Ethernet query packet, this field is decremented in step 210. If it reaches zero, for instance, the Ethernet switch 114 can assume that the packet is lost, because the limit is set such that the number should never reach zero in a diagnostic session. Since query packets can consume significant processing resources of a switch, it is important that a means be available to destroy lost query packets as performed by steps 212 and 214.

If the hop limit is not exceeded, however, the Ethernet switch 114 proceeds to step 216 where it checks if it is coupled to the source 102. If not, the Ethernet switch 114 proceeds to step 218 where it submits the Ethernet query packet to the next network element. If the network element happens to be an Ethernet switch 114, such switch will process the query packet according to steps 208 through 222, thereby appending additional telemetry data such as described in FIG. 3. If, on the other hand, the Ethernet switch 114 is coupled to the source 102, then the multicast diagnostic trace has been completed, in which case the switch proceeds to step 220 where it translate the Ethernet query packet to an IP response packet and submits it in step 222 back to the receiver 102 through the response route 111 described earlier.

FIG. 5 depicts method 300 operating in the IP routers 112. In step 302, a diagnostic packet is received. If the packet is detected in step 304 as an Ethernet query packet, then the router 112 proceeds to step 306 where it translates the Ethernet query packet to a conventional IP query packet. In step 306, the IP query packet collects the telemetry data of the router much like in the case of a conventional Mtrace packet. If, on the other hand, the diagnostic packet received in step 302 is detected in step 304 as an IP query packet, then step 306 is bypassed and telemetry collection takes place in step 308. If the router 112 is coupled to the source 102, it translates the IP query packet to an IP response packet in step 314 and transmits said packet back to the receiver 104 on the response trace 111. Otherwise, the router 112 proceeds to step 312 where it submits the IP query packet to the next network element.

Methods 200 and 300 describe algorithms operating in the Ethernet switches 114 and IP routers 112 which allow any hybrid configuration of these network elements for conducting an end-to-end diagnostic trace. This invention therefore provides a means for further visibility into the operations of a multicast network not presently available in prior art systems.

It should be evident by now that the present invention can be realized in hardware, software, or a combination of hardware and software. Moreover, the present invention can be realized in a centralized fashion, or in a distributed fashion where different elements are spread across several interconnected processors. Thus, any kind of computing device or other apparatus adapted for carrying out methods 200 and 300 described above is suitable for the present invention.

It should be also evident that the present invention may be used for many applications. Thus, although the description is made for particular arrangements and methods, the intent and concept of the invention is suitable and applicable to other arrangements and applications not described herein. It would be clear therefore to those skilled in the art that modifications to the disclosed embodiments described herein could be effected without departing from the spirit and scope of the invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

A software program in the present context means any expression, in any language, code or notation, of a set of instructions intended to cause a system having an information processing capability to perform a particular function either directly or after either or both of the following: a) conversion to another language, code or notation; b) reproduction in a different material form.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, other re-writable (volatile) memories or Signals containing instructions. A digital file attachment to e-mail or other self-contained information archive or set of archives sent through signals is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art that are applicable to the present invention. Such standards are periodically superseded by faster or more efficient equivalents having essentially the same functions. Accordingly, replacement standards and protocols having the same functions are considered equivalents.

The described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. First and second portions of a computer-readable storage medium each having computer instructions for operating an Ethernet switch and an internet protocol router, respectively, for conducting diagnostics in a multicast network having network elements comprising one or more internet protocol routers and Ethernet switches, the first portion of the computer-readable storage medium operating in the Ethernet switch, comprising computer instructions that, when executed by at least one first processor of the Ethernet switch, cause the at least one first processor to perform operations comprising:
receiving an internet protocol query packet generated by a receiver for collecting telemetry data between a source and the receiver;
translating the internet protocol query packet to an Ethernet query packet;
collecting in the Ethernet query packet telemetry data from the Ethernet switch,
wherein at least one telemetry field of the Ethernet switch includes an arrival time of the Ethernet query packet at the Ethernet Switch; and
submitting the Ethernet query packet to the next network element of the multicast network;

the second portion of the computer-readable storage medium operating in the internet protocol router, comprising computer instructions that, when executed by at least one second processor of the internet protocol router, cause the at least one second processor to perform operations comprising:
receiving the Ethernet query packet;
translating the Ethernet query packet to the internet protocol query packet; and
submitting the internet protocol query packet to the next network element of the multicast network.

2. The first and second portions of computer-readable storage medium of claim 1, wherein the first portion of the computer-readable storage medium of the Ethernet switch comprises computer instructions which when executed by the at least one first processor cause the at least one first processor to perform operations comprising:
collecting in the Ethernet query packet telemetry data from the Ethernet switch, wherein another telemetry field of the Ethernet switch includes a diagnostic code providing a state of operation of the Ethernet switch.

3. The first and second portions of computer-readable storage medium of claim 1, wherein the second portion of the storage medium of the internet protocol router comprises computer instructions which when executed by the at least one second processor cause the at least one second processor to perform operations comprising:
collecting in the internet protocol query packet telemetry data from the internet protocol router.

4. The first and second portions of computer-readable storage medium of claim 1, wherein the second portion of the storage medium of the internet protocol router comprises computer instructions which when executed by the at least one second processor cause the at least one second processor to perform operations comprising:
collecting in the internet protocol query packet telemetry data from the internet protocol router;
translating the internet protocol query packet into an internet protocol response packet; and
submitting the IP response packet to the receiver.

5. The first and second portions of computer-readable storage medium of claim 1, wherein the first portion of the storage medium of the Ethernet switch comprises computer instructions which when executed by the Ethernet switch cause the Ethernet switch to perform operations comprising:
collecting in the Ethernet query packet telemetry data from a root internet protocol router;
translating the Ethernet query packet into an internet protocol response packet; and
submitting the IP response packet to the receiver.

6. The first and second portions of computer-readable storage medium of claim 1, wherein the Ethernet switch comprises an internet group management protocol snooping Ethernet switch.

7. The first and second portions of computer-readable storage medium of claim 1, wherein the first portion of the computer-readable storage medium of the Ethernet switch comprises computer instructions which when executed by the at least one first processor cause the at least one first processor to perform operations comprising collecting the telemetry data in the Ethernet query packet from at least one of a group of telemetry items comprising an upstream network element address, a downstream network element address, a multicast channel number, an input packet count at the arrival time, an output packet count at the arrival time, a total packet count at the arrival time, a protocol operating at the Ethernet switch, or a diagnostic code.

8. The first and second portions of computer-readable storage medium of claim 7, wherein the first portion of the computer-readable storage medium of the Ethernet switch comprises computer instructions which when executed by the at least one first processor cause the at least one first processor to perform operations comprising generating the diagnostic code from at least one of a group of diagnostic codes comprising a no error code corresponding to a no-fault state in the Ethernet switch, a wrong interface code corresponding to the internet protocol packet or the Ethernet query packet received by the Ethernet switch from a network element not belonging to the multicast network, a channel route error code corresponding to the internet protocol packet or the Ethernet query packet received from a second network element on a multicast network channel different from that used by the receiver, or a router error code corresponding to receiving an expected internet protocol query packet from internet protocol router.

9. The first and second portions of computer-readable storage medium of claim 1, wherein the receiver initializes a packet hop limit in the internet protocol query packet, and wherein the first portion of the computer-readable the storage medium of the Ethernet switch comprises computer instructions which when executed by the at least one first processor cause the at least one first processor to perform operations comprising:
decrementing the packet hop limit; and
upon exceeding the packet hop limit, discarding the Ethernet query packet.

10. A method, comprising:
receiving, by an Ethernet switch, an internet protocol query packet generated by a receiver for collecting telemetry data between a source and the receiver;
translating, by the Ethernet switch, the internet protocol query packet to an Ethernet query packet;

collecting by the Ethernet switch, in the Ethernet query packet telemetry data from the Ethernet switch, wherein at least one telemetry field of the Ethernet Switch includes an arrival time of the Ethernet query packet at the Ethernet Switch; and submitting, by the Ethernet switch, the Ethernet query packet to the next network element of the multicast network;

receiving, by an internet protocol router, the Ethernet query packet;

translating, by the internet protocol router, the Ethernet query packet to the internet protocol query packet; and submitting, by the internet protocol router, the internet protocol query packet to the next network element of the multicast network.

11. The method of claim 10, comprising:
collecting, by the Ethernet switch, in the Ethernet query packet telemetry data from the Ethernet switch.

12. The method of claim 10, comprising:
collecting, by the internet protocol router, in the internet protocol query packet telemetry data from the internet protocol router.

13. The method of claim 10, comprising:
collecting, by the internet protocol router, in the internet protocol query packet telemetry data from the internet protocol router;

translating, by the internet protocol router, the internet protocol query packet into an internet protocol response packet; and submitting, by the internet protocol router, the internet protocol response packet to the receiver.

14. The method of claim 10, comprising:
collecting, by the Ethernet switch, in the Ethernet query packet telemetry data from a root internet protocol router;

translating, by the Ethernet switch, the Ethernet query packet into an internet protocol response packet; and submitting, by the Ethernet switch, the internet protocol response packet to the receiver.

15. The method of claim 10, wherein the Ethernet switch comprises an internet group management protocol snooping Ethernet switch.

16. The method of claim 10, wherein the telemetry data collected in the Ethernet query packet comprises at least one of a group comprising an upstream network element address, a downstream network element address, a multicast channel number, an input packet count at the arrival time, an output packet count at the arrival time, a total packet count at the arrival time, a protocol operating at the Ethernet switch, or a diagnostic code.

17. The method of claim 16, wherein the diagnostic code comprises at least one of a group of diagnostic codes comprising a no error code corresponding to a no-fault state in the Ethernet switch, a wrong interface code corresponding to the internet protocol packet or the Ethernet query packet received by the Ethernet switch from a network element not belonging to the multicast network, a channel route error code corresponding to the internet protocol packet or the Ethernet query packet received from a network element on a multicast network channel different from that used by the receiver, or router error code corresponding to receiving an expected internet protocol query packet from internet protocol router.

18. The method of claim 10, wherein the receiver initializes a packet hop limit in the internet protocol query packet, and wherein the method comprises:
decrementing, by the Ethernet switch, the packet hop limit; and
upon exceeding the packet hop limit, discarding, by the Ethernet switch, the Ethernet query packet.

19. An Ethernet switch, comprising:
a communications interface;
a memory storing computer instructions;
a controller coupled to the memory, wherein the controller, responsive to executing the computer instructions, performs operations comprising:
receiving an internet protocol query packet generated by a receiver for collecting telemetry data between a source and the receiver in a multicast network;
translating the internet protocol query packet to an Ethernet query packet;
collecting in the Ethernet query packet telemetry data from the Ethernet switch, wherein at least one telemetry field of the Ethernet Switch includes an arrival time of the Ethernet query packet at the Ethernet switch; and
submitting, the Ethernet query packet to the next network element of the multicast network.

20. An internet protocol router, comprising:
a communications interface;
a memory storing computer instructions;
a controller coupled to the memory, wherein the controller, responsive to executing the computer instructions performs operations comprising:
receiving an Ethernet query packet generated by an Ethernet switch having at least one field for telemetry for collecting telemetry data between a source and a receiver in a multicast network, wherein the at least one field includes at least an arrival time of the Ethernet query packet at the Ethernet switch;
translating the Ethernet query packet to an internet protocol query packet; and
submitting the internet protocol query packet to the next network element of the multicast network.

* * * * *